United States Patent [19]

Iwata

[11] Patent Number: 5,027,775

[45] Date of Patent: Jul. 2, 1991

[54] APPARATUS FOR CONTROLLING COMBUSTION CONDITION

[75] Inventor: Toshio Iwata, Hyogo, Japan

[73] Assignee: Mitsubishi Denki K.K., Tokyo, Japan

[21] Appl. No.: 310,572

[22] Filed: Feb. 15, 1989

[30] Foreign Application Priority Data

| Feb. 19, 1988 | [JP] | Japan | 63-38044 |
| Feb. 19, 1988 | [JP] | Japan | 63-38045 |
| Feb. 19, 1988 | [JP] | Japan | 63-38046 |
| Feb. 19, 1988 | [JP] | Japan | 63-38048 |
| Feb. 19, 1988 | [JP] | Japan | 63-38049 |
| Feb. 22, 1988 | [JP] | Japan | 63-39905 |
| Feb. 25, 1988 | [JP] | Japan | 63-45074 |

[51] Int. Cl.$^5$ .............................................. F02D 45/00
[52] U.S. Cl. ..................................... 123/425; 123/435
[58] Field of Search ................ 123/425, 419, 435, 436

[56] References Cited

U.S. PATENT DOCUMENTS

| 4,275,692 | 6/1981 | Takeda et al. | 123/425 |
| 4,370,964 | 2/1983 | Muranaka et al. | 123/425 |
| 4,483,295 | 11/1984 | Iida | 123/425 |
| 4,675,821 | 6/1987 | Aoki et al. | 123/425 |
| 4,710,881 | 12/1987 | Mouri et al. | 123/425 |

FOREIGN PATENT DOCUMENTS 61-215942  9/1986  Japan .

Primary Examiner—Andrew M. Dolinar
Attorney, Agent, or Firm—Sughrue,Mion,Zinn,Macpeak & Seas

[57] ABSTRACT

Disclosed is an apparatus for controlling a combustion condition of an internal combustion engine having a plurality of combustion cylinders. The combustion condition of the engine can be detected sensitively by the minimum number of combustion condition sensors, and a control of the combustion condition in each combustion cylinder can be effected on the basis of the output signals from the minimum number of combustion condition sensors. In the present invention, an operating condition of the engine and combustion condition in the predetermined group of combustion cylinders including at least one combustion cylinder are detected and then, a combustion condition control parameter, such as an ignition timing or fuel injection amount of each combustion cylinder, is controlled in accordance with both the detected operating condition and the combustion condition so as to generate an optimum combustion condition in the combustion cylinders of the engine.

2 Claims, 12 Drawing Sheets

APPARATUS FOR CONTROLLING COMBUSTION CONDITION

BACKGROUND OF THE INVENTION

1. Field of the Invention

The present invention relates to an apparatus for controlling a combustion condition in an internal combustion engine having a plurality of combustion cylinders.

2. Description of the Related Art

Known in the prior art is an apparatus for controlling a combustion condition in an internal combustion engine having a plurality of combustion cylinders wherein one or more combustion condition control parameters, such as ignition timing, air-fuel ratio of an air-fuel mixture to be fed into the engine cylinders, or supercharging pressure, are controlled to prevent the generation of knocking in the combustion cylinders when a knocking generated in each engine cylinder is detected by a knocking sensor, such an internal pressure sensor for detecting changes in the internal pressure of the combustion cylinder. For example, Japanese Unexamined Patent Public Disclosure No. 61-215942 discloses a control apparatus comprising internal pressure sensors arranged on combustion cylinders, respectively. In such a kind of apparatus, knocking generated in each combustion cylinder is detected by the corresponding internal pressure sensor, and then ignition timing of each combustion cylinder is controlled in accordance with the output signal from the corresponding internal pressure sensor so as to obtain a critical timing for preventing the generation of knocking. That is, in such a known control apparatus, control of the ignition timing of one combustion cylinder is effected in accordance with the output signal from the corresponding internal pressure sensor.

Such a known control apparatus can detect the generation of knocking with high sensitivity, since the internal pressure sensor can directly detect changes of the internal pressure in the corresponding combustion cylinder. However, in such a known control apparatus, each combustion cylinder requires a corresponding internal pressure sensor and therefore, processing of the signals output from the internal pressure sensors becomes complex and so, it makes the expenses of production of the apparatus costly.

SUMMARY OF THE INVENTION

An object of the present invention is to provide an apparatus for controlling a combustion condition of an internal combustion engine having a plurality of combustion cylinders wherein the combustion condition of the engine is detected with high sensitivity by using a minimum number of combustion condition sensors, and the control of the combustion condition of each combustion cylinder can be effected according to the output signals of the combustion condition sensors.

According to the present invention, an apparatus for controlling a combustion condition of an internal combustion engine having a plurality of combustion cylinders, in which the apparatus comprises:

means for detecting an operating condition of the engine;

means for detecting a combustion condition in at least one predetermined combustion cylinder, and means for controlling at least one combustion condition controlling parameter in accordance with an output of the operating condition detecting means and the combustion condition detecting means so as to attain an optimum condition of combustion in each combustion cylinder of the engine.

The above and other objects, features and advantages of the present invention will become more apparent from the following description of the preferred embodiments thereof, taken in conjunction with the accompanying drawings.

DESCRIPTION OF THE PREFERRED EMBODIMENTS (1) First Embodiment

Figure 1:
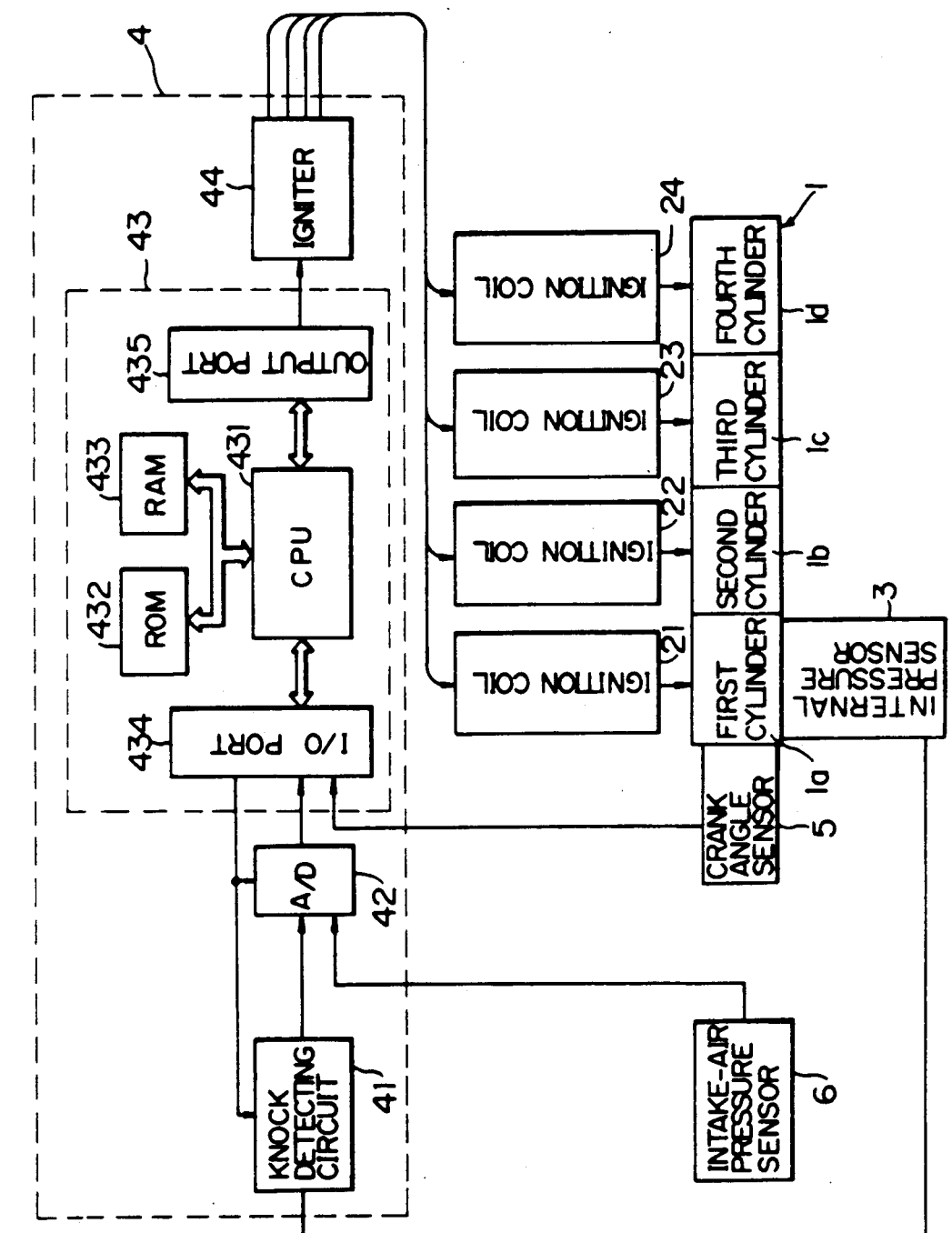
FIG. 1 is a block diagram illustrating a combustion condition controlling apparatus for an internal combustion engine having four combustion cylinders, which is shown as a first embodiment of the present invention.

FIG. 1 shows a block diagram of a first embodiment of the present invention. Referring to FIG. 1, an internal combustion engine 1 has four combustion cylinders, i.e., a first through fourth cylinders 1a to 1d. The combustion cylinders 1a to 1d are provided thereon with ignition plugs (not shown) which are connected to ignition coils 21 to 24, respectively. An internal pressure sensor 3 used as a knocking sensor is arranged on one of the cylinders of the engine 1, for example, on a first combustion cylinder 1a, and produces an analog output signal proportional to the internal pressure of the first cylinder 1a. The engine 1 has an air intake passage (not shown) for introducing air into the cylinders 1a to 1d. An air pressure sensor 6 is arranged on the engine 1 to detect the pressure of air introduced into the cylinders 1a to 1d of the engine 1 through the intake passage and to produce an analog output signal in accordance with changes of air pressure in an intake passage. The engine 1 also has a crank angle sensor 5 to produce a crank angle signal representing a rotational angular position of the crank shaft of the engine 1 and a cylinder-identifying signal for identifying the combustion cylinders 1a to 1d.

A control circuit for the engine 1, which is generally indicated at a dotted line 4 in FIG. 1, has a construction schematically illustrated by a block diagram. A knock detecting circuit 41 connected to the pressure sensor 3 is provided to judge whether knocking is generated in the first cylinders 1a on the basis of the output signal of the internal pressure sensor 3 and produce an analog output signal in accordance with an amount of knocking. The analog output signals of the knock detecting circuit 41 and the air pressure sensor 6 are converted to a digital signal by an analog-to-digital (A/D) converter 42.

A microcomputer generally indicated at 43 in FIG. 1 has therein a central processing unit (CPU) 431, a read-only memory (ROM) 432, a random access memory (RAM) 433, an input-output port (I/O port) 434, and an output port 435. The I/O port 434 is connected to the A/D converter 42 and the crank angle sensor 5. The output port 435 is connected to an igniter 44 which is connected to the ignition coils 21 to 24. The microcomputer 43 produces an ignition signal on the basis of the crank angle signal and the cylinder identifying signal which are fed from the crank angle sensor 5. The ignition signal is fed into the igniter 44, and the ignition coils 21 to 24 are then controlled by the igniter 44.

Figure 2:
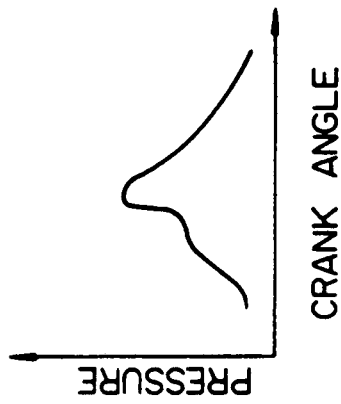
FIG. 2 illustrates an internal pressure sensor provided on the engine for sensing the internal pressure of the combustion cylinder.
Figure 3:
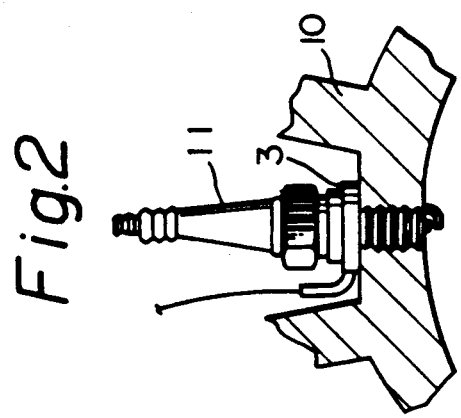
FIG. 3 shows a waveform of an output of the internal pressure sensor.

In this embodiment, as shown in FIG. 2, the internal pressure sensor of piezoelectric type has a ring-shaped configuration and is arranged between a cylinder head 10 of the first cylinder 1a and an ignition plug 11 fixed thereto. As shown in FIG. 3, the waveform of the output signal produced from the internal pressure sensor 3 corresponds to the changes of internal pressure in the first cylinder 1a, which are related to the combustion condition in the first cylinder 1a, and therefore, it is possible to detect the vibration of the internal pressure of the first cylinder 1a, which is generated by a knocking, in accordance with the output signal of the internal pressure sensor 3. That is, the internal pressure sensor 3 can be used as a combustion condition detector.

Figure 4:
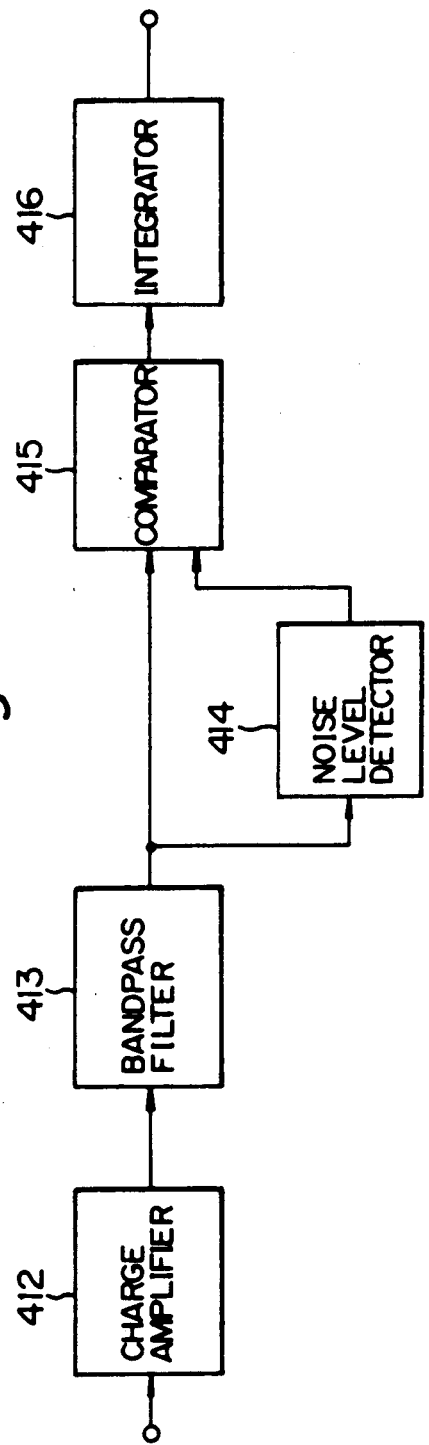
FIG. 4 is a block diagram of a knock-detecting circuit.

As shown in FIG. 4, the knock detecting means 41 comprises a charge amplifier 412 connected to the internal pressure sensor 3, a bandpass filter 413 connected to the charge amplifier 412, a noise level detector 414 connected to the bandpass filter 413, a comparator 415 connected to the bandpass filter 413 and the noise level detector 414, and an integrator connected to the comparator 415. The output signal of the internal pressure sensor 3 is converted to a voltage signal by the charge amplifier 412, and the voltage signal of the charge amplifier 412 is filtered by the bandpass filter 413 so as to be only in a predetermined range of frequency which includes components of frequency related to the vibration of the pressure generated in the first cylinder 1a by a knocking. The voltage signal filtered by the bandpass filter 413 is then input to the noise level detector 414 and the comparator 415. A threshold voltage for eliminating the component of noise frequency of the voltage signal output from the bandpass filter 413 is produced by the noise level detector 414 and then input to the comparator 415. The comparator 415 compares the output signal of the bandpass filter 413 with the threshold voltage of the noise level detector 414 and outputs a voltage signal only having a component of frequency related to the vibration of pressure generated in the first cylinder 1a by a knocking, and the voltage signal of the comparator 415 is then integrated by the integrator 416. Accordingly, the knock-detecting circuit 41 can output a voltage signal corresponding to the amount of knocking generated in the first cylinder 1a of the engine 1.

Figure 5:
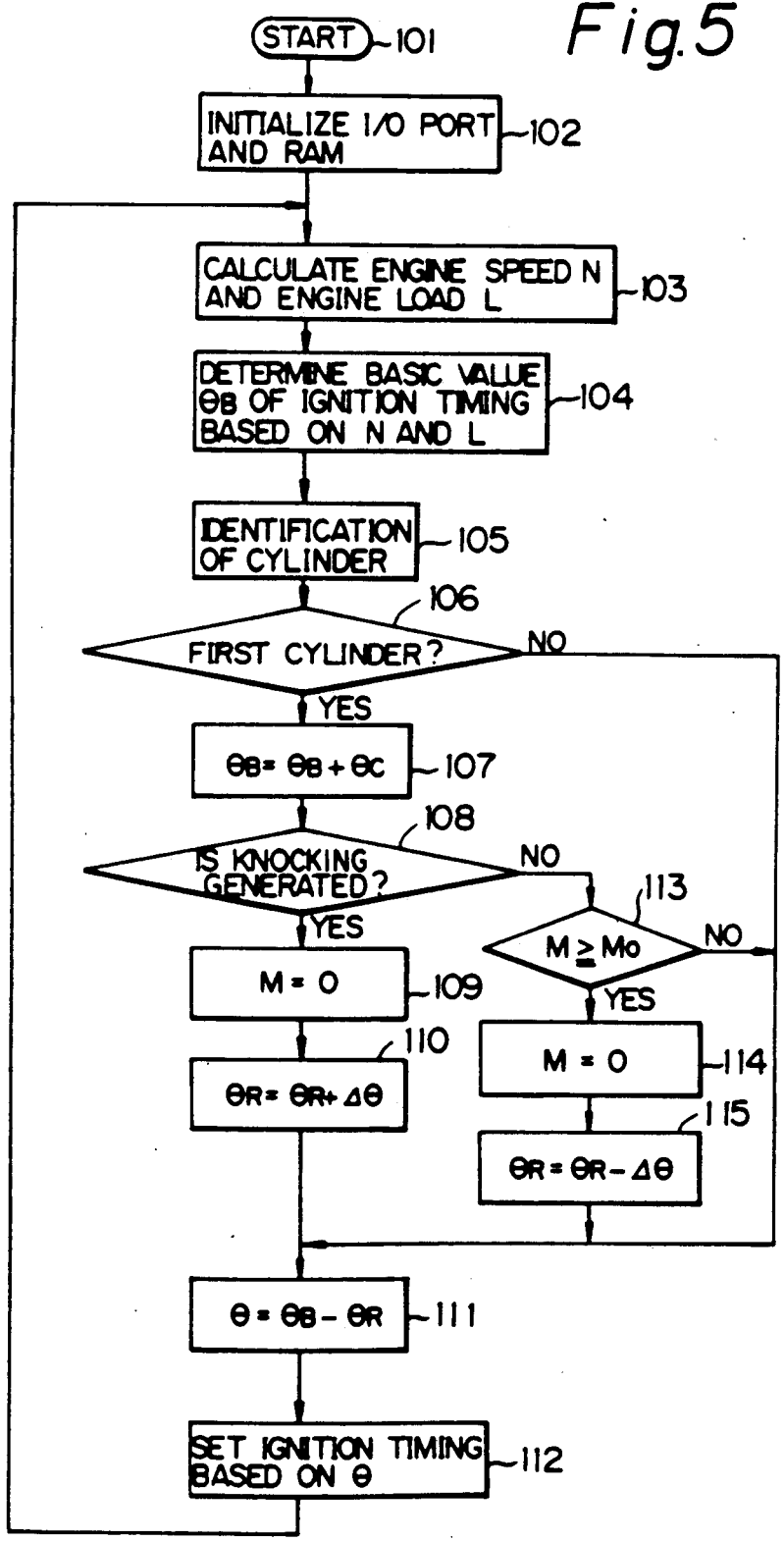
FIG. 5 is a flow chart for explaining a combustion condition control of an engine in reference to the first embodiment shown in FIG. 1.

FIG. 5 shows a flow chart for explaining a combustion condition control according to the first embodiment of the present invention. This control program is stored in the ROM 432 of the microcomputer 43. Referring to FIG. 5, when the control circuit 4 is made ON by a key switch (not shown), the program proceeds from step 101 to step 102. At step 102, I/O port 434 is set to an input or output mode, and necessary data is initialized in the RAM 433 after old data is cleared. At step 103, a rotational speed N of the engine 1 is calculated by the CPU 431 on the basis of the output signal of the crank angle sensor 5, and an engine load L is calculated by the CPU 431 on the basis of the output signal of the intake pressure sensor 6. At step 104, a basic value $\theta_B$ of the ignition timings of the cylinders 1a to 1d is calculated by a predetermined ignition timing data map stored in the ROM 432 so as to correspond to the engine speed N and the engine load L calculated at step 103, and then the calculated basic value $\theta_B$ thereof is stored in the RAM 433. At step 105, the combustion cylinders 1a to 1d are identified on the basis of the output signal of the crank angle sensor 5. Then, at step 106, it is judged whether the cylinder identified in step 105 is the first cylinder 1a or not. If NO in step 106, the program proceeds to step 111. If YES in step 106, the program proceeds to step 107 where the basic value $\theta_B$ of the ignition timing of the first cylinder 1a is increased by a predetermined value $\theta_c$. That is, the ignition timing of the first cylinder 1a is shifted toward an advanced side by a predetermined crank angle from the ignition timing of the other cylinders 1b to 1d, so that the first cylinder 1a is set in a combustion condition in which knocking is apt to occur more easily than in the other cylinders 1b to 1d. Then, at step 108, it is judged whether knocking is generated in the first cylinder 1a. If YES in step 108, then the program proceeds to step 109 where a time measuring counter, which is disclosed later in detail, is cleared. Then, at step 110, a control amount $\theta_R$ for delaying ignition timing is updated by adding thereto a predetermined correctional value $\Delta\theta$. Then, at step 111, the final value $\theta$ of the ignition timing of the first cylinder 1a is obtained by decreasing the controlled variable $\theta_R$ from the basic value $\theta_B$ which is obtained in step 107. Then, at step 112, an ignition timing command is fed from the CPU 431 to the igniter 44 on the basis of the value $\theta$ of the ignition timing. Then, the program returns to step 103, and the execution thereof is repeated. Thereby, the ignition timing for the first cylinder 1a is controlled to prevent the generation of knocking.

In turn, if NO in step 108, then the program proceeds to step 113. At step 113, it is judged whether a counted value M produced from the time measuring counter is not less than a predetermined value $M_o$. In this embodiment, the CPU 431 and the RAM 433 are utilized as the time measuring counter. That is, the CPU 431 counts the clock pulses for controlling an operation of the CPU 431 and then updates the counted value M stored in the RAM 433 whenever the CPU 431 counts one pulse. If No in step 113, i.e., the counted value M is less than the value $M_o$, the program proceeds to step 111. If YES in step 113, i.e., the counted value M is not less than the value $M_o$, the program proceeds to step 114 where the counted value M stored in the RAM 433 is cleared. Further, at step 115, a control value $\theta_R$ for delaying an ignition timing is updated by decreasing therefrom the predetermined correctional value $\Delta\theta$. That is, the control value $\theta_R$ for delaying ignition timing is decreased by the predetermined correction value $\Delta\theta$ when knocking is not generated until the counted value M becomes equal to the value $M_o$.

As will be clear from the above, the basic value $\theta_B$ of the ignition timing of the first cylinder 1a is updated toward the advanced side by adding thereto the predetermined value $\theta_c$, whereby a knocking is apt to occur easily in the first cylinder 1a. Then, the ignition timing of the first cylinder 1a is set toward the delayed side to prevent the generation of knocking when the generation of knocking is detected in the first cylinder 1a. In turn, the ignition timings of the other cylinders 1b to 1d are controlled on the basis of the basic value $\theta_B$ which was calculated by the ignition timing data map and the control value $\theta_R$ used for controlling the ignition timing of the first cylinder 1a, and thus the other cylinders 1b to 1d are maintained in a proper combustion condition in which a knocking is not generated.

(2) Second Embodiment

Figure 6:
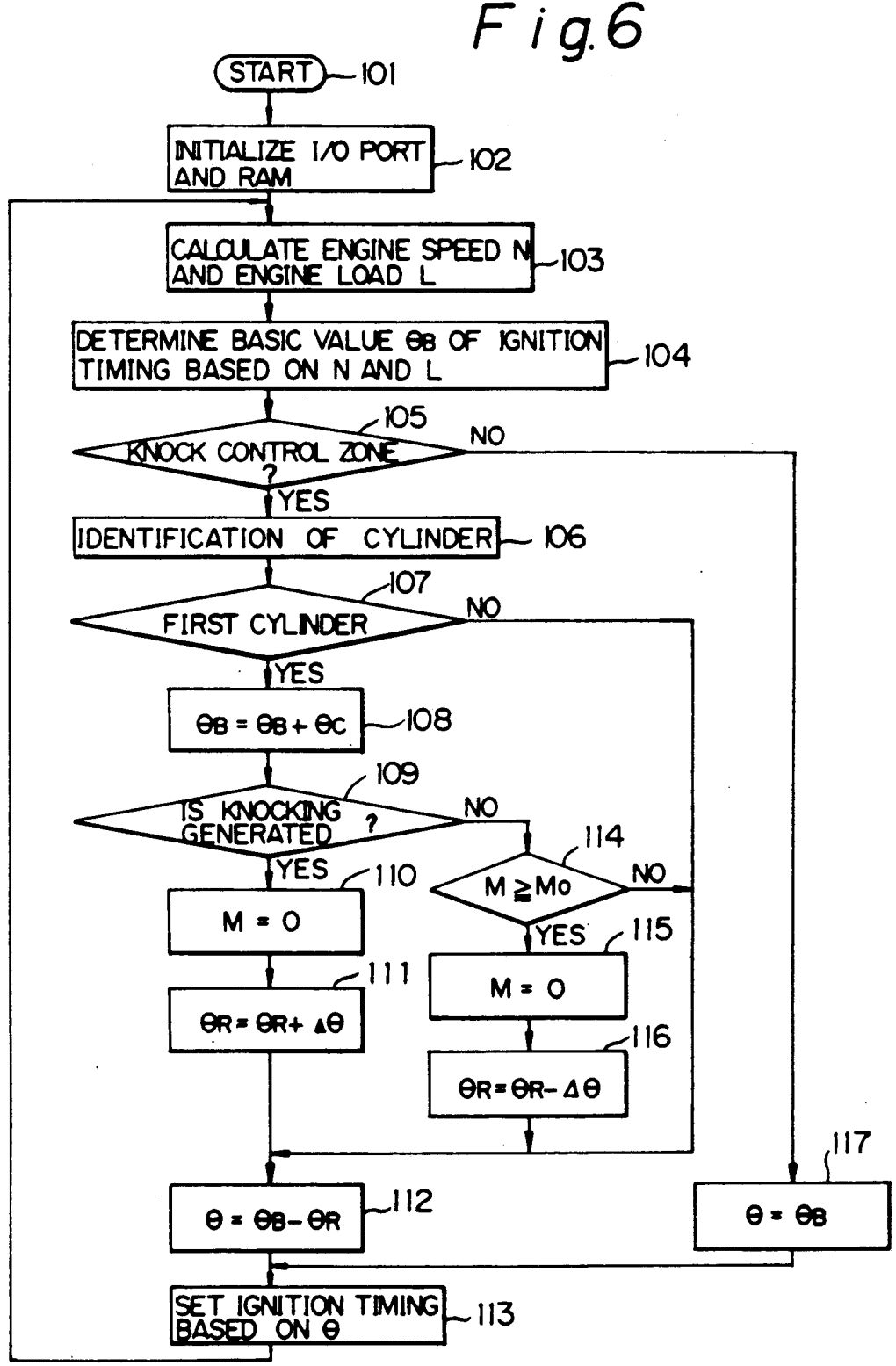
FIG. 6 is a flow chart for explaining a combustion condition control of an internal combustion engine, which is shown as a second embodiment of the present invention.

FIG. 6 shows a flow chart as a second embodiment of the present invention. The second embodiment comprises the same constituent elements as those in the first embodiment shown in FIGS. 1, 2, and 4, and the construction of the second embodiment is substantially the same as that of the first embodiment except that the second embodiment additionally includes means for judging an operating condition of the engine and then maintaining an ignition timing of the first combustion cylinder at the same value as that of the other combustion cylinders of the engine when the engine is in a predetermined operating condition.

Referring to FIG. 6, processes in steps 101 through 104 of the second embodiment are the same as those in steps 101 through 104 of the first embodiment shown in FIG. 5, and furthermore, processes in steps 106 through 116 of the second embodiment are the same as those in steps 105 through 115 of the first embodiment. In step 105 of the second embodiment, it is judged, on the basis of the engine rotational speed N and the engine load L, whether the engine 1 is in a predetermined operating condition area in which an ignition timing control is required to prevent the generation of knocking, after the basic value $\theta_B$ of the ignition timing of the cylinders 1a to 1d is calculated and stored in the RAM 433 at step 104. If YES in step 105, the program proceeds to step 106 and thus executes the same control process as that of the first embodiment. In turn, if NO in step 105, the program proceeds to step 117 where the ignition timing is set to a value $\theta$ which is the same as the basic value $\theta_B$ obtained in step 104. That is, when the engine 1 is in the operating condition area in which knocking is not generated in the cylinders 1a to 1d, each of the cylinders 1a to 1d is operated under the ignition timing which is the same as that determined by the ignition timing data map. Accordingly, the ignition timing of the first cylinder 1a does not excessively set toward the advanced side when the first cylinder 1a is in a condition in which knocking control is not necessary. Thus all of the cylinders 1a to 1d can be operated in an optimum and effective ignition timing.

(3) Third Embodiment

Figure 7:
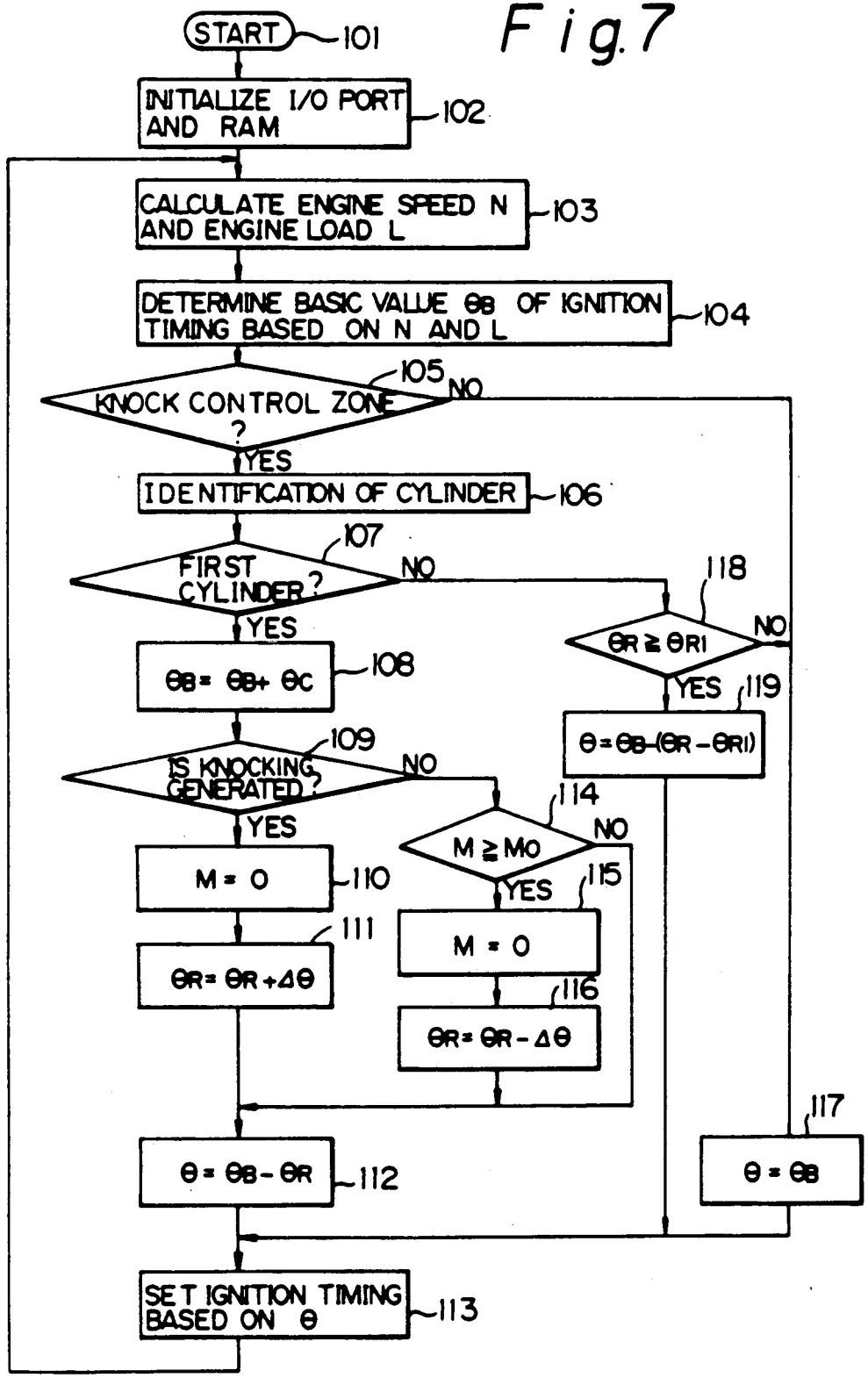
FIG. 7 is a flow chart for explaining a combustion condition control of an internal combustion engine, which is shown as a third embodiment of the present invention.

FIG. 7 shows a flow chart as a third embodiment of the present invention. The third embodiment comprises the same constituent elements as those in the first embodiment shown in FIGS. 1, 2, and 4, and the construction of the third embodiment is substantially the same as that of the second embodiment except that the third embodiment additionally includes means for executing control of ignition timings of the cylinders 1b to 1d on the basis of a controlled variable for delaying the ignition timing of the first cylinder 1a only when the controlled variable for delaying the ignition timing of the first cylinder 1a is greater than a predetermined value, and further includes means for judging the operating condition of the engine and then maintaining the ignition timing of the first combustion cylinder at the same value as that of the other combustion cylinders when the engine is in a predetermined operating condition. That is, steps 101 to 117 in FIG. 7 are the same as those in FIG. 6, but the program shown in FIG. 7 additionally includes steps 118 and 119.

Referring to FIG. 7, if it is judged at step 107 that the cylinder identified at step 106 is not the first cylinder 1a, the program proceeds to step 118 where it is judged whether the control value $\theta_R$ for delaying an ignition timing of the first cylinder 1a is not less than a predetermined value $\theta_{R1}$. If NO in step 118, the program proceeds to step 117 where the final value $\theta$ of the ignition timing of the cylinders 1b to 1d is set to the basic value $\theta_B$ obtained in step 104. In turn, if YES in step 118, the value $\theta$ of the ignition timing of the cylinders 1b to 1d is calculated from the following equation by using the basic value $\theta_B$ obtained in step 104, the control value $\theta_R$, and the predetermined value $\theta_{R1}$.

$$\theta = \theta_B - (\theta_R - \theta_{R1})$$

That is, the control for delaying the ignition timing of the cylinders 1b to 1d by the amount of "$\theta_R - \theta_{R1}$" is effected to prevent the generation of knocking in the cylinders 1b to 1d only when the control value $\theta_R$ for delaying the ignition timing of the first cylinder 1a is not less than the predetermined value $\theta_{R1}$. According to the present invention, the basic value $\theta_B$ of the ignition timing of the cylinders 1b to 1d is shifted by the predetermined value $\theta_C$ from the basic value $\theta_B$ of the ignition timing of the first cylinder 1a toward the delayed side, as apparent from steps 107 and 108 in FIG. 7. Accordingly, when the control value $\theta_R$ for delaying an ignition timing of the first cylinder 1a is smaller than the predetermined value $Q_{R1}$, it is not necessary to control the ignition timings of the cylinders 1b to 1d to be delayed. Because, in order to improve an efficiency of operation of the engine 1, it is preferable to fix the ignition timings of the cylinders 1b to 1d to the basic value $\theta_B$ even if the generation of knocking in the first cylinder 1a is detected.

(4) Fourth Embodiment

Figure 8:
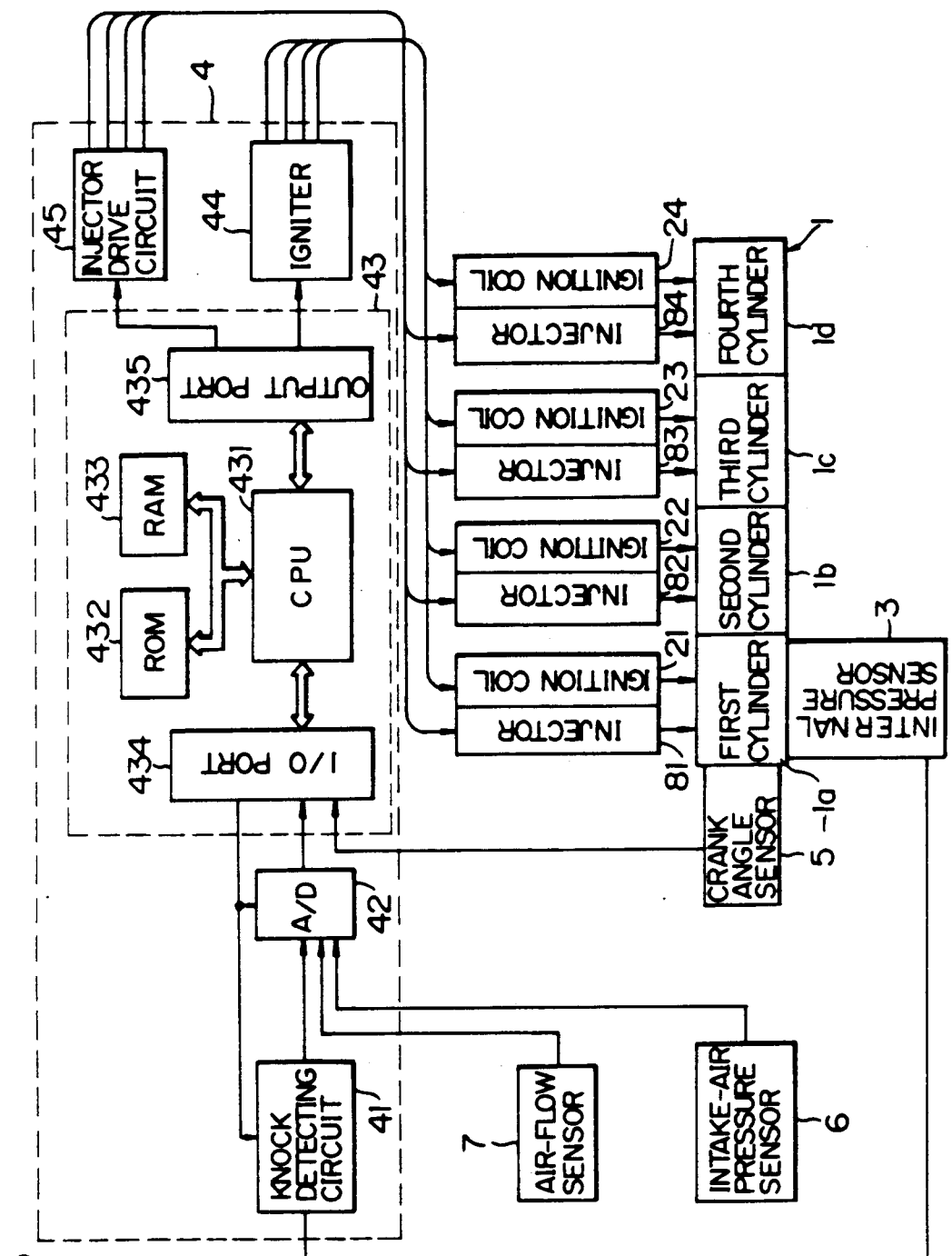
FIG. 8 is a block diagram of a combustion condition controlling apparatus for an internal combustion engine, which is shown as a fourth embodiment of the present invention.

FIG. 8 shows a block diagram of a fourth embodiment of the present invention. In FIG. 8, the same constituent elements described in the first embodiment are represented by the common reference numerals. In the fourth embodiment, two combustion control parameters, such as an ignition timing and a fuel injection quantity are controlled to prevent a generation of knocking in the combustion cylinders of an engine, in which the value of one parameter for controlling at least one predetermined combustion cylinder is changed so that a knocking is apt to occur easily in the predetermined cylinder, and then the other parameter for controlling the predetermined cylinder is controlled to prevent the generation of knocking.

Referring to FIG. 8, an internal pressure sensor 3 is provided on the first combustion cylinder 1a of the engine 1. An air-flow sensor 7 of this embodiment produces an analog signal proportional to an amount of air introduced into the engine 1, and the analog signal produced from the air-flow sensor 7 is then converted to a digital signal by the A/D converter 412. Further, four fuel injectors 81 to 84 are provided to inject the first to fourth combustion cylinders 1a to 1d of the engine 1 with fuel and these injectors 81 to 84 are connected to the output port 435 of the microcomputer 43 through an injector drive circuit 45. A fuel injection signal is calculated by the microcomputer 43 on the basis of the signal output from the air-flow sensor 7 and then fed into the injector drive circuit 45 in order to drive each of the fuel injectors 81 to 84.

Figure 9:
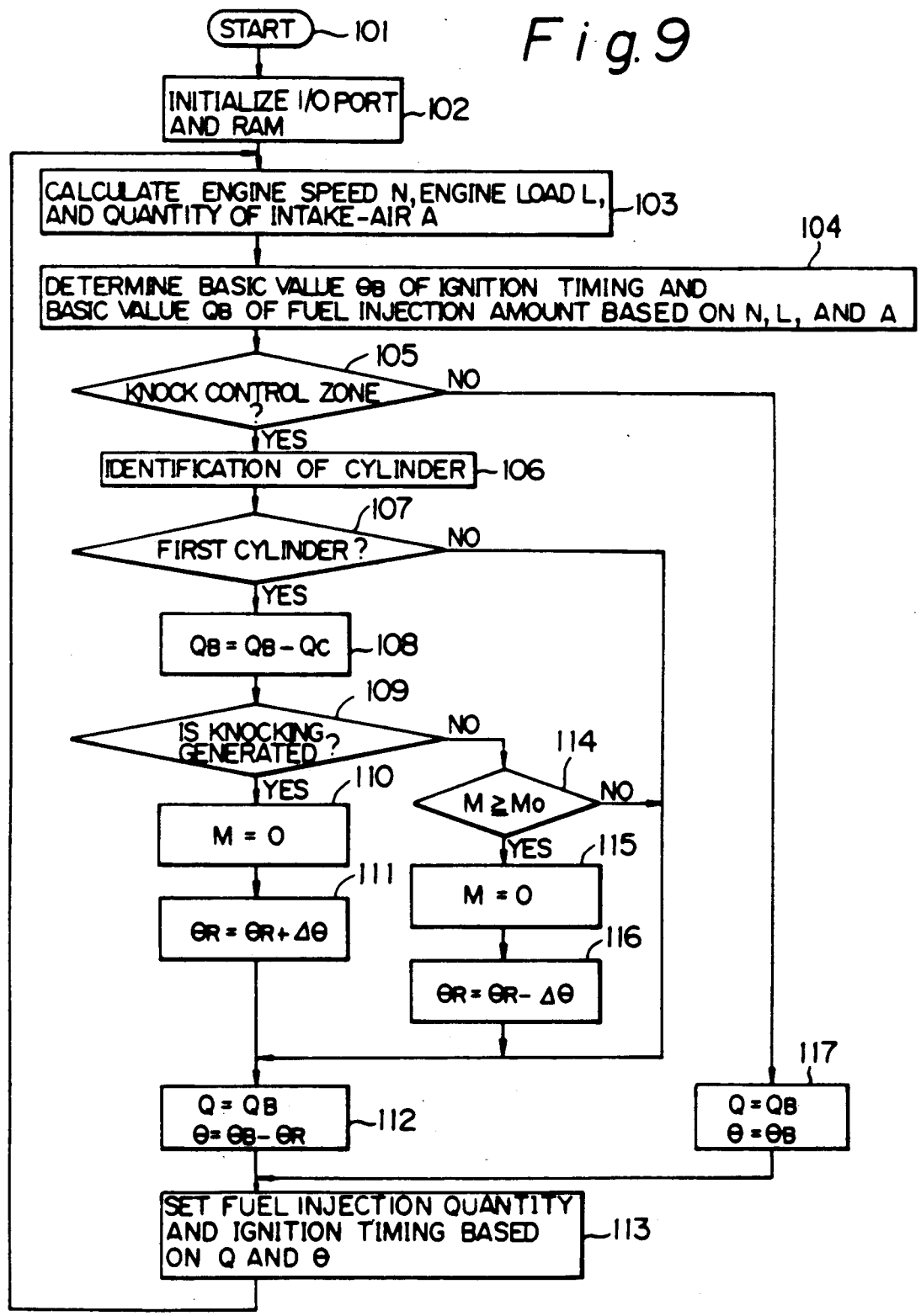
FIG. 9 is a flow chart for explaining a combustion condition control of an engine in reference to the fourth embodiment shown in FIG. 8.

FIG. 9 shows a flow chart of the combustion condition control program of the fourth embodiment of the present invention. This control program is stored in the ROM 432 of the microcomputer 43 in FIG. 8. In this embodiment, when the control circuit 4 is made ON by a key switch (not shown), the program proceeds from step 101 to step 102 in FIG. 9. At step 102, I/O port 434 is set to an input or output mode, and necessary data is initialized in the RAM 433 after the previous data is cleared. At step 103, an engine rotational speed N and an engine load L are calculated in the same manner as those in the above-mentioned embodiments, and an air-intake quantity A is calculated on the basis of the output signal of the air-flow sensor 7.

At step 104 in FIG. 9, a basic value $\theta_B$ of the ignition timing of the cylinders 1a to 1d is read from a predetermined ignition timing data map in the same manner as that of the above-mentioned embodiments and further a basic value $Q_B$ of the fuel injection quantity of the cylinders 1a to 1d is read from a predetermined basic fuel injection quantity data map stored in the RAM 433. The basic value $Q_B$ corresponds to the air-intake amount A. The basic values $\theta_B$ and $Q_B$ are then stored in the RAM 433.

In step 105, it is judged whether the ignition timing of the engine 1 should be controlled to prevent the generation of knocking. This judgement is formed on the basis of the engine rotational speed N, the engine load L, and the air-intake quantity A which represent the operating condition of the engine 1. That is, in step 105, it is judged whether the operating condition of the engine 1 is in a predetermined area or not, and if NO in step 105, the program then proceeds to step 117 where the final value $\theta$ of the ignition timing is set to the basic value $\theta_B$ obtained in step 104. In turn, if NO in step 105, the program proceeds to step 117 where the final values $\theta$ and Q of the ignition timing and the fuel injection quantity of the cylinders 1a to 1d are set to the basic values $\theta_B$ and $Q_B$ obtained in step 104, respectively. Then, at step 113, the ignition timing and the fuel injection quantity is set on the basis of the final values $\theta$ and Q obtained in step 117.

If YES in step 105, the process represented by steps 106 and 107 are executed. The steps 106 and 107 are the same as the steps 105 and 106 of the first embodiment. If NO in step 107, the program proceeds to step 112 where the final value $\theta$ of the ignition timing of the cylinders 1b to 1d is obtained by decreasing the controlled variable from the basic value $\theta_B$ obtained in step 104, and the final value Q of the fuel ignition amount for the cylinders 1b to 1d is set to the value $Q_B$ obtained in step 108. Then, at step 113, an ignition timing and fuel injection quantity commands are fed from the CPU 431 to the igniter 44 and the injector drive circuit 45, respectively, on the basis of the final values $\theta$ and Q. Then, the program returns to step 103, and the execution thereof is repeated.

If YES in step 107, then the program proceeds to step 108 where the basic value $Q_B$ of the fuel injection quantity of the first cylinder 1a is decreased by a predetermined value $Q_C$. Accordingly, the air-fuel (A/F) ratio of the air-fuel mixture to be introduced into the combustion cylinder 1a is set to a level which is leaner than that of the air-fuel mixture to be introduced into other combustion cylinders 1b to 1d, and thus, a knocking is apt to occur easily in the first cylinder 1a than other cylinders 1b to 1d.

Then, at step 109, it is judged whether knocking is generated in the first cylinder 1a. If YES in step 109, then the program proceeds to step 110 where the time measuring counter is cleared. Then, at step 111, a controlled variable $\theta_R$ for delaying ignition timing is updated by adding thereto a predetermined value $\Delta\theta$. Then, at step 112, the final value $\theta$ of the ignition timing of the first cylinder 1a is calculated by decreasing the controlled variable $\theta_R$ from the basic value $\theta_B$ obtained in step 104, and the final value Q of the fuel ignition amount of the first cylinder 1a is set to the value $Q_B$ obtained in step 108. Then, at step 113, an ignition timing and fuel injection quantity commands are fed from the CPU 431 to the igniter 44 and the injector drive circuit 45 on the basis of the final values $\theta$ and Q. Then, the program returns to step 103, and the execution thereof is repeated. As the result, the ignition timing of the first cylinder 1a is controlled to prevent generation of knocking.

In turn, if NO in step 109, then the program proceeds to step 114. Processes in steps 114 to 116 shown in FIG. 9 are the same as those in steps 113 to 114 in the first embodiment or steps 114 to 116 in the second and third embodiments. Then, the program proceeds to step 112.

As will be apparent from the above, in the fourth embodiment, the fuel injection quantity of the first cylinder 1a is set to a value that is leaner than that of other cylinders 1b to 1d and thereby, a knocking is apt to occur easily in the first cylinder 1a. Therefore, the ignition timing of the first cylinder 1a can be set to a value that is equal to that of other cylinders 1b to 1d and thus, the ignition timing control of all the cylinders 1a to 1d can be easily effected by using the same variable for the delay control.

In order to effect a knocking control of the present invention, other parameters for controlling a combustion condition, such as an air-fuel ratio of an air-fuel mixture or a supercharging pressure, are available. This knocking control is executed on the basis of a variable such as a crank angle at the point of maximum internal pressure, or an average value of effective internal pressure which can be obtained on the basis of the output signal of the internal pressure sensor.

Further, a vibration sensor can be substituted for the internal pressure sensor 3 of the first through fourth embodiments.

Instead of using a single knocking sensor, a plurality of knocking sensors are available for the present invention. In this case, a plurality of output signals of the knocking sensors are fed into a knock-detecting circuit through an analog-multiplexer provided before the knock-detecting circuit. Furthermore, the process for determining a first cylinder in step 106 of FIG. 5 or step 107 of FIGS. 6 to 9 should be modified to determine the combustion cylinders provided with a knocking sensor.

The above-mentioned first to fourth embodiments can be modified to have a construction in which an ignition timing of the combustion cylinders having no knocking sensor are controlled on the basis of an additional control variable. The additional controlled variable is independently calculated on the basis of an output of the knock-detecting circuit or on the basis of the control variable for delaying an ignition timing of the predetermined combustion cylinder with a knocking sensor. In order to attain the modification mentioned above, the process for calculating the additional controlled variable and the ignition timing should be provided between steps 106 and 111 of FIG. 5.

(5) Fifth Embodiment

Figure 10:
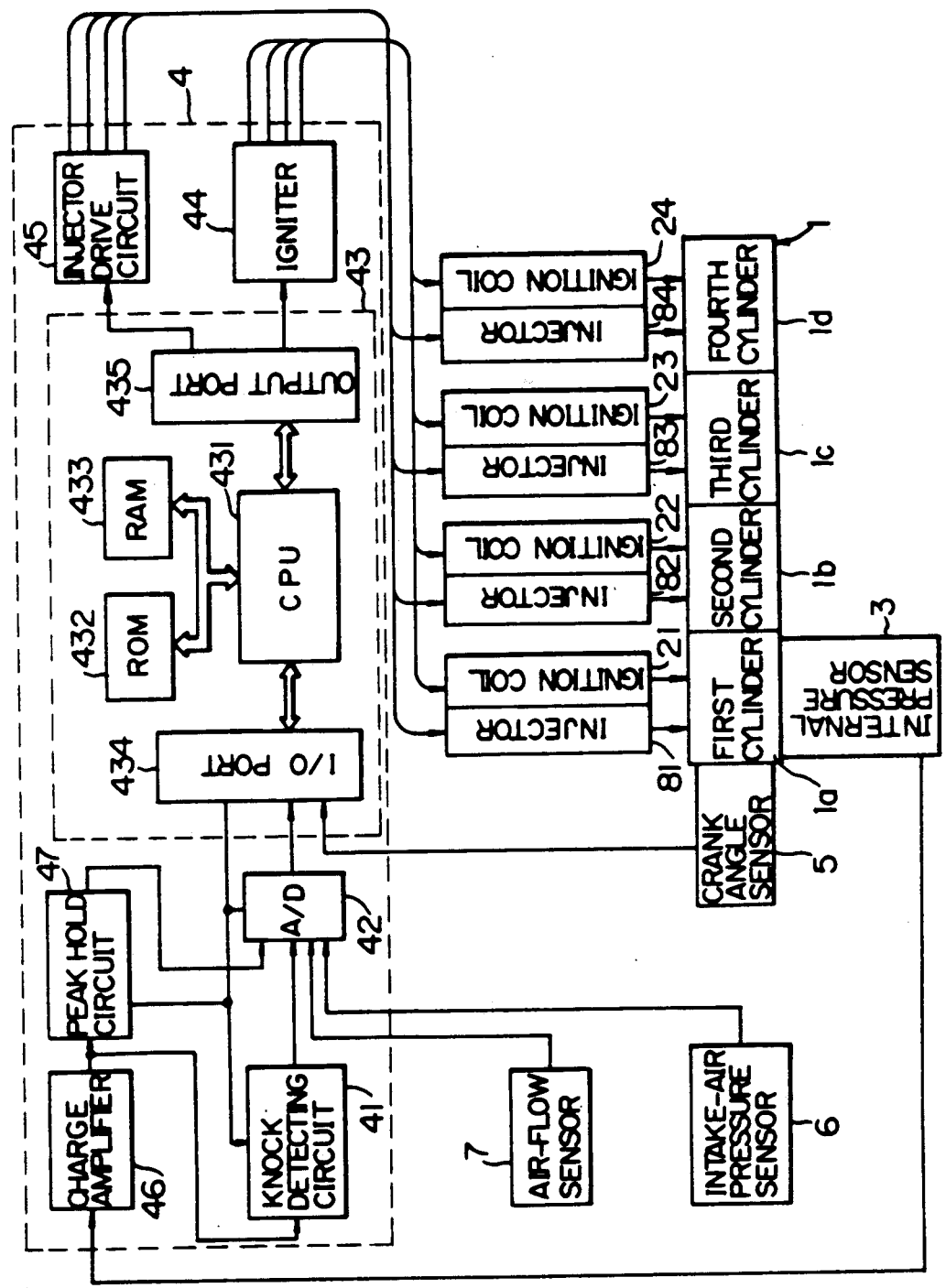
FIG. 10 is a block diagram of a combustion condition control apparatus for an internal combustion engine, which is shown as a fifth embodiment of the present invention.
Figure 11:
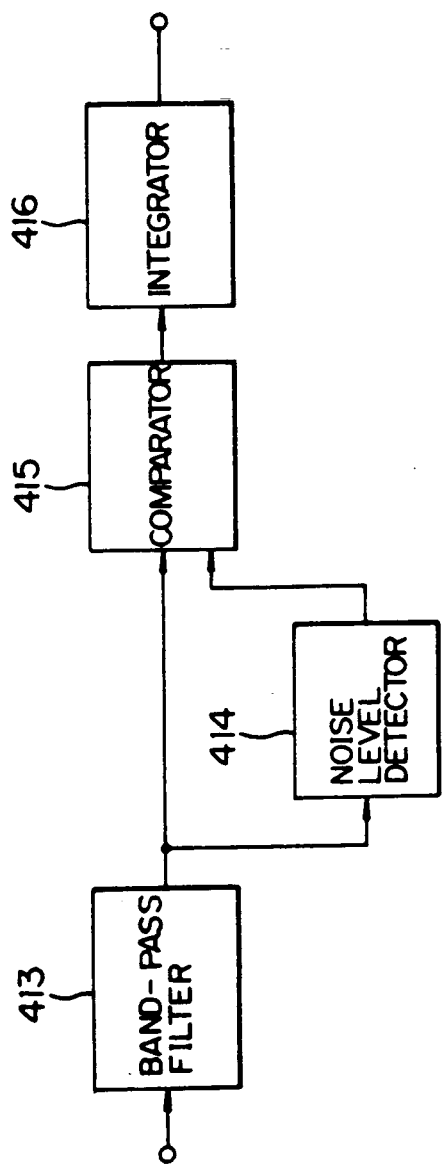
FIG. 11 is a block diagram of the knock detecting circuit shown in FIG. 10.

FIG. 10 is a block diagram illustrating a construction of a fifth embodiment of the present invention, and FIG. 11 shows a block diagram of the noise detecting circuit 41 shown in FIG. 10. The fifth embodiment of the present invention is characterized in that the two combustion condition control parameters, which are controlled in accordance with the combustion condition of the predetermined at least one combustion cylinder, are selected on the basis of the predetermined two operating conditions of the engine.

In FIGS. 10 and 11, the common constituent elements in the first and fourth embodiments are indicated by the same reference numerals. In the fifth embodiment, an output signal of the internal pressure sensor 3 is converted to the corresponding voltage value by a charge amplifier 46 and the output signal of the charge amplifier 46 is input to both the bandpass filter 413 of the knock detecting circuit 41 and a peak hold circuit 47. The knock detecting circuit 41 produces an output signal in proportion to the amount of generation of knocking. The peak hold circuit 47 can pick up the maximum voltage of the output signal from the charge amplifier 46 and output a maximum value of data which is proportional to the maximum value of the internal pressure of the first cylinder 1a. Output signals of the internal pressure sensor 6, the air-flow sensor 7, the knock detecting circuit 41, and the peak hold circuit 47 are converted to digital signals by the A/D converter 42. The maximum value data fed from the peak hold circuit 47 to the microcomputer 43 through the A/D converter 42 is stored in the RAM 433 whenever the ignition for the first cylinder 1a is effected by the corresponding ignition plug.

Figure 12:
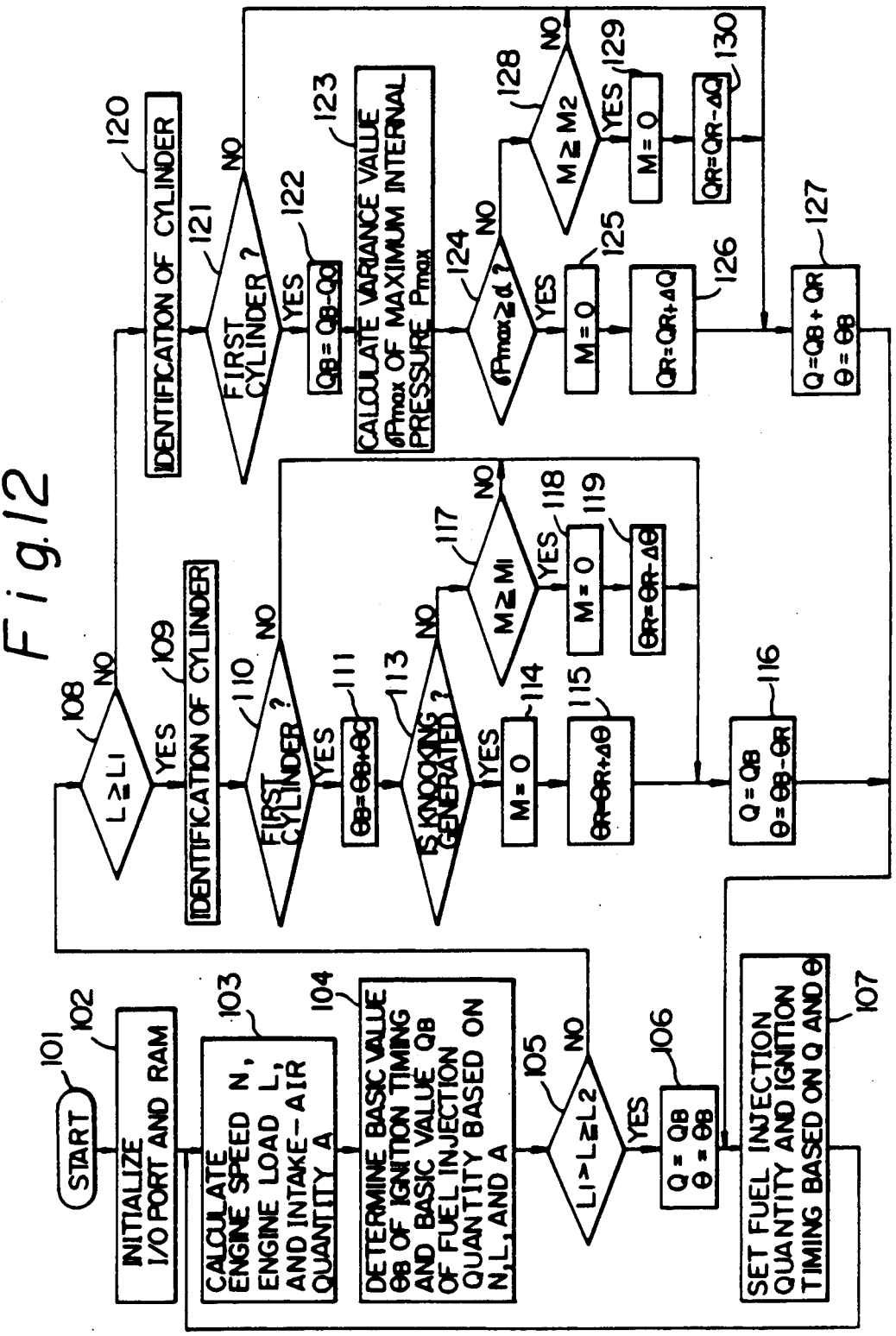
FIG. 12 is a flow chart of a combustion condition control of an engine with reference to the fifth embodiment shown in FIG. 10.

FIG. 12 shows a flow chart for explaining a combustion condition control program according to the fifth embodiment of the present invention. This control program is stored in the ROM 432 of the microcomputer 43 shown in FIG. 10. In the fifth embodiment, it is judged whether the engine 1 is in one of the predetermined three operating conditions. These operating conditions are as follows:

(1) When the engine 1 is in a medium load region, the engine load L obtained in step 103 is less than a predetermined first level $L_1$ but not less than a predetermined second level $L_2$.
(2) When the engine 1 is in a high load region, the engine load L obtained in step 103 is not less than the predetermined first level $L_1$.
(3) When the engine 1 is in a low load region, the engine load L obtained in step 103 is less than the predetermined second level $L_2$.

When the engine 1 is in the medium load region, i.e., $L_1 > L \geq L_2$, knocking does not occur in the combustion cylinders 1a to 1d of the engine 1. Therefore, it is not necessary to control combustion condition control parameters, such as an ignition timing and a fuel injection quantity. However, when the engine 1 is in the high load region, i.e., $L \geq L_1$, or in the low load region, i.e., $L < L_2$, it is necessary to control such combustion condition control parameters in different modes. Accordingly, in the fifth embodiment, the control program shown in FIG. 12 executes three kinds of process in accordance with the above-mentioned three kinds of operating conditions of the engine 1.

Referring to FIG. 12, the processes of the program executed in steps 101 to 104 are the same as those in the fourth embodiment shown in FIG. 9.

In step 105, it is judged whether or not the engine 1 is in the above-mentioned medium load region, represented by $L_1 > L \geq L_2$. If YES in step 105, then the program proceeds to step 106 where the final values Q and $\theta$ of the fuel injection quantity and the ignition timing of the combustion cylinders 1a to 1d are made equal to the basic values $Q_B$ and $\theta_B$ which are obtained in step 104, respectively. Then, in step 107, the fuel injection quantity and the ignition timing of all the cylinders 1a to 1d are set on the basis of the final values Q and $\theta$ obtained in step 106, and then the program returns to step 103.

If NO in step 105, i.e., $L \geq L_1$, or $L_2 > L$, then the program proceeds to step 108 where it is judged whether the engine 1 is in the above-mentioned high load region, i.e., $L \geq L_1$. If NO in step 108, then the program proceeds to step 120 as described later. If YES in step 108, then the program proceeds to step 109 where the combustion cylinders 1a to 1d are identified in accordance with the output signal of the crank angle sensor 5. Then, in step 110, it is judged whether the cylinder identified in step 109 is the first cylinder 1a or not. If NO in step 110, then the program proceeds to step 116 as described later. If YES in step 110, then the program proceeds to step 111 where the basic value $\theta_B$ of the ignition timing is updated by adding thereto the predetermined value $\theta_C$. Then, the program proceeds to step 113 where it is judged whether knocking is generated in the first cylinder 1a on the basis of the output signal from the internal pressure sensor 3. If YES in step 113, the program proceeds to step 114 where the counted value M of a time measuring counter is cleared. Then, in step 115, a controlled variable $\theta_R$ for delaying an ignition timing is updated by adding thereto a predetermined correctional value $\Delta\theta$. Then, in step 116, the final value $\theta$ of the ignition timing of the first cylinder 1a is obtained by decreasing the controlled variable $\theta_R$ from the basic value $\theta_B$ obtained in step 111.

In turn, if NO in step 113, the program proceeds to step 117 where it is judged whether the counted value M of the counter is not less than a predetermined value $M_1$. If NO in step 117, i.e., if the count value M is less than the value $M_1$, the program proceeds to step 116. If YES in step 117, i.e., in case the count value M is not less than the value $M_1$, the program proceeds to step 118 where the count value M stored in the RAM 433 is cleared. Then, in step 119, the controlled variable $\theta_R$ for delaying an ignition timing is updated by decreasing therefrom the predetermined correctional value $\Delta\theta$.

Then, the program proceeds to step 116 where the final value Q of the fuel injection amount is made equal to the basic value $Q_B$ which is obtained in step 104, and the final value $\theta$ of the ignition timing is obtained by decreasing the control value $\theta_R$ from the basic value $\theta_B$ obtained in step 111 or step 104. Then, in step 107, the fuel injection amount and the ignition timing of the first cylinder $1a$ or other cylinders $1b$ to $1d$ are set in accordance with the final values Q and $\theta$ obtained in step 116, and then the program returns to step 103.

That is, when the operating condition of the engine 1 is in the predetermined high load region, the basic value $\theta_B$ of the ignition timing of the first cylinder $1a$ is updated toward the advanced side by adding thereto the predetermined value $\theta_C$, whereby knocking is apt to occur easily in the first cylinder $1a$. Then, in order to prevent the generation of knocking, the ignition timing of the first cylinder $1a$ is controlled toward the delayed side in accordance with the detection of the generation of knocking in the first cylinder $1a$. In turn, the ignition timing of other cylinders $1b$ to $1d$ is controlled on the basis of the basic value $\theta_B$ which is calculated by the ignition timing data map and the controlled variable $\theta_R$ used for controlling the ignition timing of the first cylinder $1a$, and thus the other cylinders $1b$ to $1d$ are maintained in a proper combustion condition in which knocking is not generated.

In turn, if it is judged in step 108 that the engine 1 is in the predetermined low load region, i.e., $L<L_2$, then the program proceeds to step 120 where the combustion cylinders $1a$ to $1d$ are identified on the basis of the output signal of the crank angle sensor 5. Then, in step 121, it is judged whether or not the cylinder identified in step 121 is the first cylinder $1a$. If NO in step 122, the program proceeds to step 127 as described later. If YES in step 121, then the program proceeds to step 122 where the basic value $Q_B$ of the fuel injection quantity of the first cylinder $1a$ is decreased by a predetermined value $Q_O$. Accordingly, the air fuel (A/F) ratio of the air-fuel mixture to be introduced into the combustion cylinder $1a$ is set to a level which is leaner than that of the air-fuel mixture to be introduced into other combustion cylinder $1b$ to $1d$, and thus, knocking is apt to occur more easily in the first cylinder $1a$ than the other cylinders $1b$ to $1d$.

Then, the program proceeds to step 123 where a variance value $\sigma P_{max}$ of the maximum internal pressure values $P_{max}$ is calculated in the interval of a predetermined term from a totalization of the maximum internal pressure values $P_{max}$ each of which is produced in every one ignition cycle of the first cylinder $1a$ and stored in the RAM 433. The variance value $\Delta P_{max}$ represents a degree of the stability of combustion condition. That is, when the air-fuel ratio of the air-fuel mixture introduced into the combustion cylinder comes into excessively lean area, the burning rate of the air-fuel mixture in the combustion cylinder becomes late, and thus the maximum value $P_{max}$ moves to the delayed side and becomes small. In this situation, since a mismatched combustion causing the increase of fluctuation in a single combustion cycle is generated, the variance value $\Delta P_{max}$ of the maximum value $P_{max}$ becomes greater than that in the stable combustion condition. Accordingly, in step 124, it is judged whether the combustion condition in the first cylinder $1a$ is unstable i.e., $\sigma P_{max} \geq \alpha$. If YES in step 124, the program proceeds to step 125 where the counted value M of the counter is cleared. Then, in step 126, the value of a controlled variable $Q_R$ for controlling the fuel injection quantity is updated by decreasing therefrom a predetermined correctional value $\Delta Q$. Then, in step 127, the final value Q of the fuel injection quantity is obtained by adding the control amount $Q_R$ to the basic value $Q_B$ which is obtained in step 122, and the final value $\theta$ of the ignition timing is made equal to the basic value $\theta_B$ which is obtained in step 104. Then, in step 107, the fuel injection quantity and the ignition timing of the first cylinder $1a$ are set on the basis of the final values Q and $\theta$ obtained in step 127.

In turn, in step 124, if it is recognized that the combustion condition is stable, i.e., $\sigma P_{max} < \alpha$, the program proceeds to step 128. In step 128, it is judged whether a counted value M produced by the time measuring counter is not less than a predetermined value $M_2$. If NO, i.e., if the count value M is less than the value $M_2$, the program proceeds to step 127. If YES, i.e., if the counted value M is not less than the value $M_2$, the program proceeds to step 129 where the counted value M stored in the RAM 433 is cleared. Further, in step 130, the value of the controlled variable $Q_R$ is updated by decreasing therefrom the predetermined value $\Delta Q$. That is, the controlled variable $\theta_R$ for enriching the air-fuel mixture to be introduced into the first cylinder $1a$ is decreased by the predetermined correctional value $\Delta Q$, when a stable combustion is maintained in the first cylinder $1a$ until the counted value M becomes equal to the value $M_2$.

In turn, in step 121, if it is recognized that the cylinder identified in step 120 is not the first cylinder $1a$, the program proceeds to step 127 where the final value Q of the fuel injection quantity is obtained by adding the controlled variable $Q_R$ obtained in step 126 or 130 to the basic value $Q_B$ obtained in step 104, and the final value $\theta$ of the ignition timing is made equal to the basic value $\theta_B$ obtained in step 104, that is, the fuel injection quantity of the cylinders $1b$ to $1d$ is controlled on the basis of the controlled variable $Q_R$ corrected to stabilize a combustion in the first cylinder $1a$, and thus in the cylinders $1b$ to $1d$ a stable combustion condition is maintained.

(6) Sixth Embodiment

Figure 13:
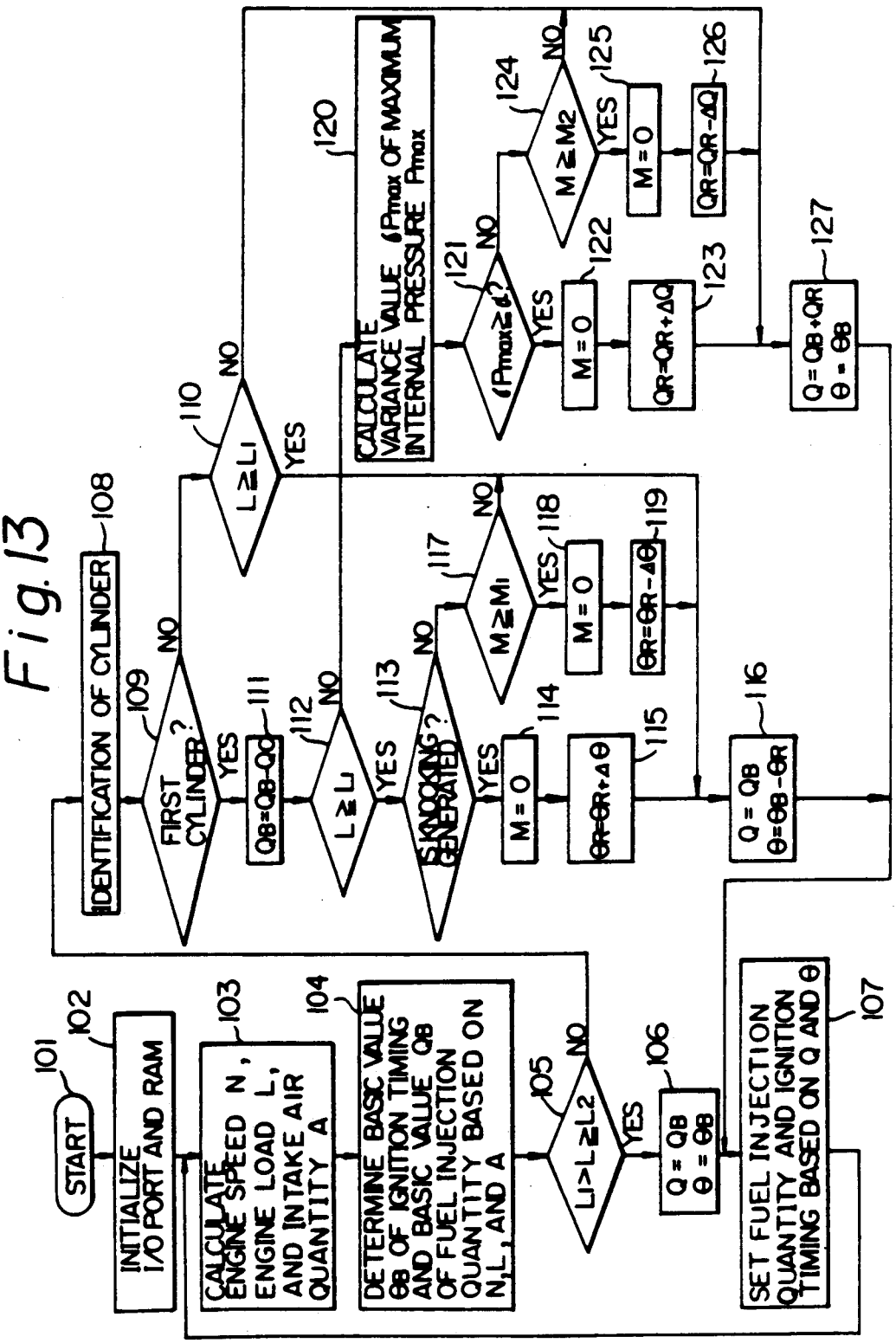
FIG. 13 is a flow chart of a combustion condition control of an internal combustion engine, which is shown as a sixth embodiment of the present invention.

FIG. 13 shows a flow chart for a sixth embodiment of the present invention. The sixth embodiment comprises the same constituent elements as those in the fifth embodiment shown in FIGS. 10 and 11, and the construction of the sixth embodiment is substantially the same as that of the fifth embodiment except that, in the sixth embodiment, two combustion condition control parameters to be controlled to obtain a stable combustion condition are selected in accordance with the operating condition of the engine, after the value of a predetermined combustion condition control parameters is changed to generate an unstable combustion condition in at least one predetermined combustion cylinder.

Referring to FIG. 13, processes in steps 101 through 104 of the sixth embodiment are the same as those in steps 101 through 104 of the fifth embodiment shown in FIG. 12. In step 105, it is judged whether the engine 1 is in the predetermined medium load region, i.e., $L_1 > L \geq L_2$. If YES in step 105, then the program proceeds to step 106 where the final values Q and $\theta$ of the fuel injection quantity and the ignition timing of the combustion cylinders 1a to 1d are made equal to the basic values $Q_B$ and $\theta_B$ which are obtained in step 104, respectively. Then, in step 107, the fuel injection quantity and the ignition timing of all of the cylinders 1a to 1d are set on the basis of the final values Q and $\theta$ obtained in step 106, and then the program returns to step 103.

If NO in step 105, i.e., if $L \geq L_1$, or $L_2 > L$, the program proceeds to step 108 where the combustion cylinders 1a to 1d are identified on the basis of the output signal of the crank angle sensor 5. Then, in step 109, it is judged whether the cylinder identified in step 108 is the first cylinder 1a. If NO in step 109, then the program proceeds to step 110 as described later.

If YES in step 109, the program proceeds to step 111 where the basic value $Q_B$ of the fuel injection amount is updated by decreasing therefrom a predetermined value $Q_C$. Accordingly, the air-fuel (A/F) ratio of the air-fuel mixture to be introduced into combustion cylinder 1a is set to a level which is leaner than that of the air-fuel mixture to be introduced into other combustion cylinders 1b to 1d, and thus, knocking is apt to occur in the first cylinder 1a more easily than the other cylinders 1b to 1d.

Then, the program proceeds to step 112 where it is judged whether the engine 1 is in the predetermined high load region represented by $L \geq L_1$. If NO in step 112, there the program proceeds to step 120 as described later. If YES in step 112, the program proceeds to step 113 where it is judged whether a knocking is generated in the first cylinder 1a on the basis of the output signal of the internal pressure sensor 3. If YES in step 113, then the program proceeds to step 114 where the counted value M of a time measuring counter is cleared. Then, at step 115, a controlled variable $\theta_R$ for delaying an ignition timing is updated by adding thereto a predetermined correctional value $\Delta\theta$. Then, at step 116, the final value $\theta$ of the ignition timing of the first cylinder 1a is obtained by decreasing the controlled variable $\theta_R$ from the basic value $\theta_B$ obtained in step 104.

In turn, if NO in step 113, then the program proceeds to step 117 where it is judged whether the counted value M of the counter is not less than a predetermined value $M_1$. If NO in step 117, i.e., if the counted value M is less than the value $M_1$, the program proceeds to step 116. If YES in step 117, i.e., if the counted value M is not less than the value $M_1$, the program proceeds to step 118 where the counted value M stored in the RAM 433 is cleared. Further, at step 119, the controlled variable $\theta_R$ for delaying an ignition timing is updated by decreasing therefrom the predetermined correctional value $\Delta\theta$.

Then, the program proceeds to step 116 where the final value Q of the fuel injection quantity is made equal to the basic value $Q_B$ obtained in step 111, and the final value $\theta$ of the ignition timing is obtained by decreasing the controlled variable $\theta_R$ obtained in step 119 from the basic value $\theta_B$ obtained in step 104. Then, at step 107, the fuel injection quantity and the ignition timing of the first cylinder 1a is set on the basis of the final values Q and $\theta$ obtained in step 116, and then the program returns to step 103.

Accordingly, when the operating condition of the engine 1 is in the predetermined high load region, the basic value $Q_B$ of the fuel injection quantity of the first cylinder 1a is updated toward the lean side by decreasing therefrom the predetermined value $Q_C$, whereby the first cylinder 1a comes into an unstable combustion condition. Then, the ignition timing of the first cylinder 1a is controlled toward the delayed side to prevent the generation of knocking when the generation of knocking in the first cylinder 1a is detected.

In turn, if it is recognized in step 112 that the engine 1 is in the predetermined low load region represented by $L_1 \geq L_1$ the program proceeds to step 120 where a variance value $\sigma P_{max}$ of the maximum internal pressure values $P_{max}$ is calculated in the interval of a predetermined term from a totalization of the maximum internal pressure values $P_{max}$ each of which is produced in every one ignition cycle of the first cylinder 1a and stored in the RAM 433. The variance value $\sigma P_{max}$ represents a degree of the stability of combustion condition. That is, when the air-fuel ratio of the air-fuel mixture introduced into the combustion cylinder comes into excessively lean area, the burning rate of the air-fuel mixture in the combustion cylinder becomes late, and thus the maximum value $P_{max}$ moves to the delayed side and becomes small. In this situation, since a mismatched combustion increasing a fluctuation in a single combustion cycle is generated, the variance value $\sigma P_{max}$ of the maximum value $P_{max}$ becomes greater than that of the stable combustion condition. Accordingly, in step 121, it is judged whether the combustion condition in the first cylinder 1a is unstable, i.e., $\sigma P_{max} \geq \alpha$. If YES in step 124, the program proceeds to step 122 where the counted value M of the counter is made clear. Then, in step 123, the value of a control amount $Q_R$ for controlling the fuel injection quantity is updated by adding thereto a predetermined correctional value $\Delta Q$. Then, in step 127, the final value Q of the fuel injection quantity is obtained by adding the control amount $Q_R$ to the basic value $Q_B$ obtained in step 111, and the final value $\theta$ of the ignition timing is made equal to the basic value $\theta_B$ obtained in step 104. Then, in step 107, the fuel injection quantity and the ignition timing of the first cylinder 1a are set on the basis of the final values Q and $\theta$ obtained in step 127.

In turn, if it is recognized in step 121 that the combustion condition is stable, i.e., $\sigma P_{max} < \alpha$, the program proceeds to step 124 where it is judged whether the counted value M of the counter is not less than a predetermined value $M_2$. If NO, i.e., if the step value M is less than the value $M_2$, the program proceeds to step 127. If YES, i.e., if the counted value M is not less than the value $M_2$, the program proceeds to step 125 where the counted value M stored in the RAM 433 is cleared. Then, in step 126, the value of the control amount $Q_R$ is updated by decreasing therefrom the predetermined value $\Delta Q$. That is, the controlled variable $\theta_R$ for enriching the air-fuel mixture to be introduced into the first cylinder 1a is decreased by the predetermined correctional value $\Delta Q$.

In turn, if it is recognized in step 109 that the cylinder identified in step 108 is not the first cylinder 1a, the program proceeds to step 110 where it is judged whether the engine 1 is in the predetermined high load region, i.e., $L \geq L_1$. If YES in step 110, then the program proceeds to step 116 where the final value Q of the fuel injection quantity is made equal to the basic value $Q_B$ obtained in step 104, and the final value $\theta$ of the ignition timing is obtained by decreasing the control value $\theta_R$ from the basic value $\theta_B$. Then, in step 107, the fuel injection amount and the ignition timing of the first cylinder 1a is set on the basis of the final values Q and $\theta$ obtained in step 116, and then the program returns to step 103.

If NO in step 110, the program proceeds to step 127 where the final value Q of the fuel injection quantity is obtained by adding the controlled variable $Q_R$ to the basic value $Q_B$, and the final value $\theta$ of the ignition timing is made equal to the basic value $\theta_B$. That is, the ignition timing and the fuel injection quantity of the cylinders 1b to 1d are selectively controlled on the basis of the controlled variable $\theta_R$ and $Q_R$ corrected to stabilize a combustion condition in the first cylinder 1a in accordance with the operating condition of the engine 1 and thus, a stable combustion condition is maintained in the cylinders 1b to 1d.

(7) Seventh Embodiment

Figure 14:
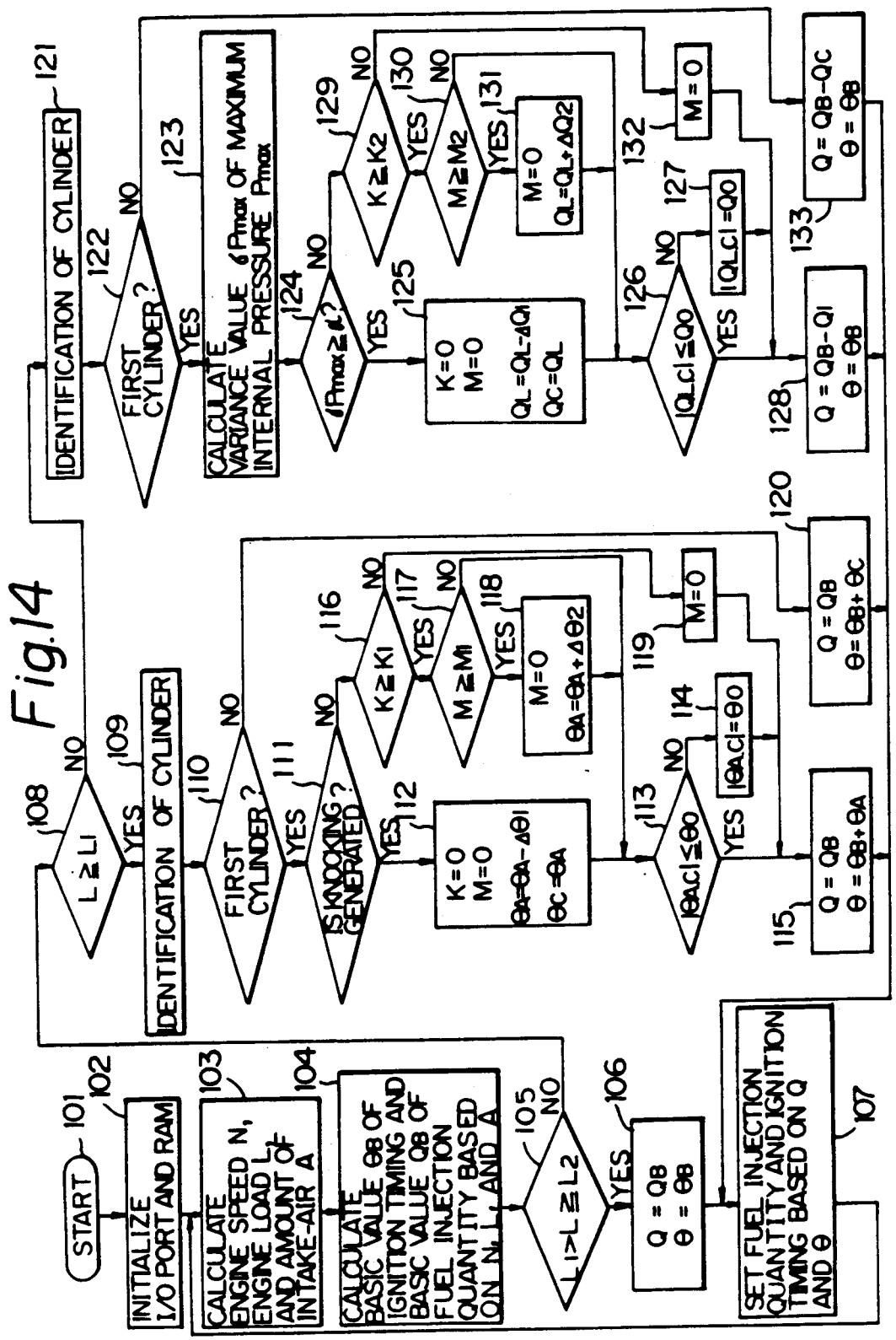
FIG. 14 is a flow chart of a combustion condition control of an internal combustion engine, which is shown as a seventh embodiment of the present invention.

FIG. 14 shows a flow chart for explaining a combustion condition controlling program according to the seventh embodiment of the present invention. The seventh embodiment comprises the same constituent elements as those in the fifth embodiments shown in FIGS. 10 and 11, and the construction of the seventh embodiment is substantially the same as that of the fifth embodiment except that, in the seventh embodiment, two combustion condition control parameters to be controlled to obtain a stable combustion condition are gradually changed to easily generate an unstable combustion condition in the predetermined at least one combustion cylinder.

Referring to FIG. 14, processes in steps 101 through 104 of the seventh embodiment are the same as those in steps 101 through 104 of the fifth embodiment shown in FIG. 12.

At step 105, it is judged whether the engine 1 is in a predetermined medium load region, i.e., $L_1 > L \geq L_2$. If YES in step 105, then the program proceeds to step 106 where the final values Q and $\theta$ of the fuel injection quantity and the ignition timing of the combustion cylinders 1a to 1d are made equal to the basic values $Q_B$ and $\theta_B$ which are obtained in step 104, respectively. Then, in step 107, the fuel injection quantity and the ignition timing are set on the basis of the final values Q and $\theta$ obtained in step 106, and then the program returns to step 103.

If NO in step 105, i.e., $L \geq L_1$, or $L_2 > L$, then the program proceeds to step 108 where it is judged whether the engine 1 is operated in a predetermined high load region, i.e., $L \geq L_1$. If NO in step 108, the program proceeds to step 121 as described later. If YES in step 108, the program proceeds to step 109 where the combustion cylinders 1a to 1d are identified on the basis of the output signal of the crank angle sensor 5. Then, in step 110, it is judged whether the cylinder identified in step 109 is the first cylinder 1a. If NO in step 110, the program proceeds to step 120 as described later. If YES in step 110, the program proceeds to step 111 where it is judged whether a knocking is generated in the first cylinder 1a on the basis of the output signal from the internal pressure sensor 3 provided on the first cylinder 1a. If NO in step 111, the program proceeds to step 116 as described later. If YES in step 111, then the program proceeds to step 112 where the counted values K and M of a first and second time measuring counters, which are described later in detail, are cleared, respectively, i.e., K=O, and M=O. Further, in step 112, the value of a first controlled variable $\theta_A$ stored in the RAM 433 for controlling the ignition timing of the first cylinder 1a is updated by decreasing therefrom a predetermined correction amount $\Delta\theta_1$, and then the value of a second controlled variable $\theta_C$ stored in the RAM 433 for controlling the ignition timing of the other cylinders 1b to 1d is updated to a value which is the same as that of the updated first controlled variable $\theta_A$. In this embodiment, the CPU 431 and the RAM 433 are used as the above-mentioned first and second counters. That is, the CPU 431 counts clock pulses for controlling the operation of the CPU 431 and then updates the counted values K and M stored in the respective addresses in the RAM 433 whenever the CPU 431 counts one pulse.

Then, in step 113, it is judged whether the absolute values of the first and second controlled variable $\theta_A$ and $\theta_C$ are not greater than a predetermined value $\theta_O$. If YES, i.e., if $|\theta_{A,C}| \leq \theta_O$ in step 113, the program proceeds to step 115. If NO, i.e., if $|\theta_{A,C}| > \theta_O$ in step 113, the program proceeds to step 114 where the absolute values of the first and second controlled variable $\theta_A$ and $\theta_C$ are made equal to the predetermined value $\theta_O$. That is, the first and second controlled variable $\theta_A$ and $\theta_C$ for advancing or delaying the timing ignition of the cylinders 1a to 1d are limited within the region in which these variables $\theta_A$ and $\theta_C$ are not greater than the predetermined value $\theta_O$.

Then, in step 115, where the final value Q of the fuel injection quantity is made equal to the basic value $Q_B$ obtained in step 104, and the final value $\theta$ of the ignition timing is obtained by adding the first controlled variable $\theta_A$ obtained in step 112 or step 114 to the basic value $\theta_B$ obtained in step 104. Then, in step 107, the fuel injection quantity and the ignition timing of the first cylinder 1a are set on the basis of the final values Q and $\theta$ obtained in step 115.

As apparent from the above, the generation of knocking in the first cylinder 1a is prevented by the process in which the first controlled variable $\theta_A$ for advancing the ignition timing of the first cylinder 1a is decreased by the predetermined correctional quantity $\Delta\theta_1$ after the generation of knocking in the first cylinder 1a is detected.

In turn, if it is recognized in step 111 that a knocking is not generated in the first cylinder 1a, the program proceeds to step 116 where it is judged whether the counted value K of the first counter is not less than a predetermined value $K_1$. If NO, i.e., if $K < K_1$ in step 116, the program proceeds to step 119 where the counted value M of the second counter is cleared to be at M=O. Then, the program proceeds to step 115. If YES, i.e., if $K \geq K_1$ in step 116, the program proceeds to step 117 where it is judged whether the counted value M of the second counter is not less than a predetermined value $M_1$. If NO, i.e., if $M < M_1$ in step 117, the program proceeds to step 113. If YES, i.e., $M \geq M_1$ in step 117, the program proceeds to step 118 where the counted value M of the second counter is cleared to be at M=O and the value of the first controlled variable $\theta_A$ stored in RAM 433 is updated by adding thereto a predetermined correctional quantity $\Delta\theta_2$. Then, the program proceeds to step 113.

As apparent from the above, after the value of the first controlled variable $\theta_A$ for advancing the ignition timing of the first cylinder 1a is decreased by the predetermined correctional quantity $\Delta\theta_1$, the value of the first controlled variable $\theta_A$ is updated by adding thereon the predetermined correctional quantity $\Delta\theta_2$ whenever the counted value M of the second counter reaches the predetermined value $M_1$, only when a knocking is not generated in the first cylinder 1a after the counted value K of the first counter reaches the predetermined value $K_1$. In this way, the ignition timing of the first cylinder 1a is gradually changed by the predetermined value $\Delta\theta_2$ toward the advanced side to easily generate a knocking in the first cylinder 1a. Then, the ignition timing of the first cylinder 1a is corrected by the predetermined value $\Delta\theta_1$ toward the delayed side on the basis of the detection of the generation of knocking in the first cylinder 1a to prevent the generation of knocking.

In turn, if it is recognized in step 110 that the cylinder identified in step 109 is not the first cylinder 1a, the program proceeds to step 120 where the final value Q of the fuel injection quantity is made equal to the basic value $Q_B$ obtained in step 104, and the final value $\theta$ of the ignition timing is obtained by adding the second controlled variable $\theta_C$ obtained in step 112 to the basic value $\theta_B$ obtained in step 104. That is, the ignition timing of the cylinders 1b to 1d is controlled on the basis of the second controlled variable $\theta_C$ corresponding to the first controlled variable $\theta_A$ which has been corrected to delay the ignition timing of the first cylinder 1a when a knocking is generated in the first cylinder 1a.

As apparent from the above, the ignition timing of the cylinders 1b to 1d is controlled on the basis of the controlled variable applied to the ignition timing of the first cylinder 1a. Therefore, a combustion in the cylinders 1b to 1d is maintained in a condition of preventing the generation of knocking.

In turn, if it is recognized in step 108 that the engine 1 is in a predetermined low load region represented by $L_1 \geq L$, the program proceeds to step 121 where the combustion cylinders 1a to 1d are identified on the basis of the output signal of the crank angle sensor 5. Then, in step 122, it is judged whether the cylinder identified in step 121 is the first cylinder 1a. If NO in step 122, the program proceeds to step 133 as described later. If YES in step 122, the program proceeds to step 123 where a variance value $\sigma P_{max}$ of the maximum internal pressure values $P_{max}$ is calculated in the interval of a predetermined term on the basis of the sum total of the maximum internal pressure values $P_{max}$ each of which is produced from every ignition cycle of the first cylinder 1a and stored in the RAM 433. The variance value $\sigma P_{max}$ represents a degree of the stability of combustion. That is, when the air-fuel ratio of the air-fuel mixture introduced into the combustion cylinder comes into excessively lean area, the burning velocity of the air-fuel mixture in the combustion cylinder becomes late, and thus the maximum value $P_{max}$ moves to the delayed side and becomes small. In this situation, since an abnormal combustion causing the increase of fluctuation in a single combustion cycle is generated, the variance value $\sigma P_{max}$ of the maximum value $P_{max}$ becomes greater than that of the stable combustion condition. Accordingly, at step 124, it is judged whether the combustion condition in the first cylinder 1a is in an unstable condition represented by $\sigma P_{max} \geq a$. If YES in step 124, the program proceeds to step 125 where the counted values K and M of a third and fourth counters are cleared. The above-mentioned first and second counters can be used as the third and fourth counters, respectively. Further, in step 125, the value of a third controlled variable $Q_L$ for controlling the fuel injection quantity in the first cylinder 1a is updated by decreasing therefrom a predetermined correctional value $\Delta Q_1$, and then a fourth controlled variable $Q_C$ for controlling the fuel injection quantity in the cylinders 1b to 1d is set to the same value as the updated third controlled variable $Q_L$. Then in steps 126 and 127, the absolute value of the third and fourth controlled variable $Q_L$ and $Q_C$ are limited to be not greater than the predetermined value $Q_O$. Then, in step 128, the final value Q of the fuel injection quantity is obtained by decreasing the third control amount $Q_L$ from the basic value $Q_E$ obtained in step 104, and the final value $\theta$ of the ignition timing is made equal to the basic value $\theta_B$ obtained in step 104. Then, in step 107, the fuel injection quantity and the ignition timing of the first cylinder 1a are set on the basis of the final values Q and $\theta$ obtained in step 128. Accordingly, the air-fuel ratio of the air-fuel mixture to be introduced into the first cylinder 1a is changed toward the rich side by increasing the fuel injection quantity of the first cylinder 1a, and thus the combustion condition in the first cylinder 1a is stabilized.

In turns, in step 124, if it is recognized that the combustion condition is in a stable condition represented by $\sigma P_{max} < a$, the program proceeds to step 129. Processes of the program effected in step 129 through 132 are similar to those in steps 116 through 119. Accordingly, after the value of the third controlled variable $Q_L$ is corrected to the rich side by the predetermined correctional value $\Delta Q_1$ when an unstable combustion condition is detected in the first cylinder 1a, the value of the third controlled variable $Q_L$ is updated toward the lean side by adding thereon the predetermined correctional value $\Delta Q_2$ whenever the counted value M of the fourth counter reaches the predetermined value $M_2$ only when it is recognized that the first cylinder 1a is in the stable condition after the counted value K of the third counter reaches the predetermined value $K_2$. In this way, the fuel injection quantity of the first cylinder 1a is gradually changed by the predetermined value $\Delta Q_2$ toward the rich side in order to generate an unstable combustion in the first cylinder 1a. Then, the fuel injection quantity of the first cylinder 1a is corrected by the predetermined value $\Delta Q_1$ toward the lean side to stabilize the combustion condition in the first cylinder 1a when an unstable combustion condition is detected in the first cylinder 1a.

In turn, in step 122, if it is recognized that the cylinder identified in step 121 is not the first cylinder 1a, the program proceeds to step 133 where the final value Q of the fuel injection quantity is obtained by decreasing the fourth controlled variable $Q_C$ obtained in step 125 from the basic value $Q_B$ obtained in step 104, and the final value $\theta$ of the ignition timing is made equal to the basic value $\theta_B$ obtained in step 104. That is, the fuel injection quantity of the cylinders 1b to 1d is controlled on the basis of the fourth controlled variable $Q_C$. The fourth controlled variable corresponds to the third control variable that has been corrected to stabilize 1a, and therefore, a stable condition is maintained in the cylinders 1b to 1d.

In order to control a knocking and a fuel injection quantity in the fifth through seventh embodiments mentioned above, an exhaust gas recirculation ratio or a supercharging pressure can be used as a parameter for controlling a combustion condition of an engine. In case these parameters are used to control a knocking and a fuel injection quantity of an engine, the control of an engine should be effected on the basis of a maximum value of an internal pressure of a cylinder, a crank angle when the internal pressure becomes maximum, or an average of the effective internal pressure.

Furthermore, a vibration sensor is substituted for an internal pressure sensor 3 of the above-mentioned fifth through seventh embodiments of the present invention.

Instead of using a single knocking sensor, a plurality of knocking sensors are available for the fifth through seventh embodiments of the present invention. In this case, a plurarity of output signals of the knocking sensors 3 are fed into a knock-detecting circuit 41 and a peak-hold circuit 47 through an analog-multiplexer. Furthermore, the process for determining a first cylinder in step 110 or 121 of the fifth embodiment of the present invention should be modified to determine the combustion cylinders having a knocking sensor.

The fifth through seventh embodiments can be modified to have a construction in which an ignition timing of the combustion cylinders having no knocking sensor are controlled on the basis of an additional control variable. The additional controlled variable is independently calculated on the basis of an output data of the knock-detecting and peak-holding circuits or on the basis controlled variable for controlling a combustion condition in the cylinders having a knocking sensor. In order to attain the modification mentioned above, the process for calculating the additional controlled variable, an ignition timing, and fuel injection quantity should be provided between steps 110 and 120, or steps 122 and 133 of FIG. 14.

Although the present invention has been described through specific terms, it should be noted here that the described embodiments are not necessary exclusive and that various changes and modifications may be imparted thereto without departing from the scope of the invention which is limited solely by the appended claims.

What is claimed is:

1. An apparatus for controlling a combustion condition of an internal combustion engine having combustion cylinders, said apparatus comprising:

means for detecting an operating condition of said engine;

means for detecting a combustion condition in at least one predetermined combustion cylinder;

means for controlling at least one combustion condition controlling parameter in accordance with an output of said operating condition detecting means and said combustion condition detecting means so as to attain an optimum condition of combustion in each of said combustion cylinders of said engine;

means for setting said combustion controlling parameter at a first value suitable for an operating condition of said engine in accordance with an output of said operating condition detecting means, said first value of said combustion controlling parameter being calculated by predetermined data maps;

means for changing the value of said combustion controlling parameter of said predetermined combustion cylinder to obtain a second value of said combustion controlling parameter which is apt to cause the generation of an unstable combustion in said predetermined combustion cylinder;

a first adjusting means for adjusting the value of said combustion controlling parameter of said predetermined combustion cylinder on the basis of a value detected by said combustion condition detecting means so as to obtain a third value of said combustion controlling parameter which can provide an optimum combustion in said predetermined combustion cylinder;

a second adjusting means for adjusting the value of said combustion controlling parameter of the combustion cylinders other than said predetermined combustion cylinder in accordance with a value detected by said combustion condition detecting means or a difference between said second and third values of said combustion controlling parameter of said predetermined combustion cylinder; and means for executing said second adjusting means only when said difference between said second and third values of said combustion controlling parameter of said predetermined combustion cylinder is greater than predetermined amount.

2. An apparatus for controlling a combustion condition of an internal combustion engine having combustion cylinders, said apparatus comprising:

means for detecting an operating condition of said engine;

means for detecting a combustion condition in at least one predetermined combustion cylinder;

means for controlling at least one combustion condition controlling parameter in accordance with an output of said operating condition and detecting means and said combustion condition detecting means so as to attain an optimum condition of combustion in each of said combustion cylinders of said engine;

means for setting said combustion condition control parameters at respective first values suitable for an operating condition of said engine in accordance with an output of said means for detecting an operating condition of said engine;

means for changing the value of at least one of said combustion controlling parameters for controlling a combustion condition in said predetermined combustion cylinder of said engine to obtain a second value of said combustion controlling parameters which is apt to cause the generation of an unstable combustion in said predetermined combustion cylinder;

a first adjusting means for adjusting the value of at least one of said combustion controlling parameters for controlling a combustion condition in said predetermined combustion cylinder on the basis of a value detected by said combustion condition detecting means to obtain a third value of said combustion controlling parameters which can provide an optimum combustion condition in said predetermined combustion cylinder;

a second adjusting means for adjusting the value of at least one of said combustion controlling parameters for controlling the combustion condition in the combustion cylinders other than said predetermined combustion cylinder on the basis of a value detected by said combustion condition detecting means or a difference between said second and third values of one of said combustion controlling parameters for controlling a combustion condition in said predetermined combustion cylinder; and wherein said one of said combustion controlling parameters adjusted by said first adjusting means is different from said one of said combustion controlling parameters changed by said changing, and said one of said parameters adjusted by said second adjusting means corresponds to said one of said combustion controlling parameters adjusted by said first adjusting means.

* * * * *